(12) United States Patent
Lazaridou et al.

(10) Patent No.: US 12,008,473 B2
(45) Date of Patent: Jun. 11, 2024

(54) AUGMENTING MACHINE LEARNING LANGUAGE MODELS USING SEARCH ENGINE RESULTS

(71) Applicant: DeepMind Technologies Limited, London (GB)

(72) Inventors: Angeliki Lazaridou, London (GB); Elena Gribovskaya, London (GB); Nikolai Grigorev, London (GB); Wojciech Jan Stokowiec, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 18/104,210

(22) Filed: Jan. 31, 2023

(65) Prior Publication Data
US 2023/0244934 A1    Aug. 3, 2023

(30) Foreign Application Priority Data

Jan. 31, 2022   (GR) .............................. 20220100089

(51) Int. Cl.
*G06N 3/08* (2023.01)
*G06F 16/953* (2019.01)
*G06N 20/00* (2019.01)
(52) U.S. Cl.
CPC ............. *G06N 3/08* (2013.01); *G06F 16/953* (2019.01); *G06N 20/00* (2019.01)
(58) Field of Classification Search
CPC ................................. G06N 3/08; G06F 16/953
See application file for complete search history.

(56) References Cited

U.S. PATENT DOCUMENTS 11,398,226 B1\*   7/2022   Wang .................. G10L 15/1822
2018/0114108 A1   4/2018   Lao et al.
2022/0156298 A1\*   5/2022   Mahmoud ........... G06F 16/9535
(Continued)

OTHER PUBLICATIONS

Guu, Kelvin, et al. "Retrieval augmented language model pretraining." International conference on machine learning. PMLR, 2020. (Year: 2020).\*
(Continued)

*Primary Examiner* — Michael J Huntley
*Assistant Examiner* — Sehwan Kim
(74) *Attorney, Agent, or Firm* — Fish & Richardson P.C.

(57) ABSTRACT

Methods, systems, and apparatus, including computer programs encoded on computer storage media, for augmenting machine learning language models using search engine results. One of the methods includes obtaining question data representing a question; generating, from the question data, a search engine query for a search engine; obtaining a plurality of documents identified by the search engine in response to processing the search engine query; generating, from the plurality of documents, a plurality of conditioning inputs each representing at least a portion of one or more of the obtained documents; for each of a plurality of the generated conditioning inputs, processing a network input generated from (i) the question data and (ii) the conditioning input using a neural network to generate a network output representing a candidate answer to the question; and generating, from the network outputs representing respective candidate answers, answer data representing a final answer to the question.

20 Claims, 5 Drawing Sheets

(56) References Cited

U.S. PATENT DOCUMENTS

2022/0318255 A1* 10/2022 Fei .................... G06F 16/24578
2022/0358361 A1* 11/2022 Otsuka .................... G06F 40/56
2023/0073052 A1* 3/2023 Mohylevskyy ........ G06N 3/088

OTHER PUBLICATIONS

Lee, Kenton, et al. "Learning recurrent span representations for extractive question answering." arXiv preprint arXiv:1611.01436 (2017). (Year: 2017).*

Devlin, Jacob, et al. "Bert: Pre-training of deep bidirectional transformers for language understanding." arXiv preprint arXiv:1810.04805 (2019). (Year: 2019).*

Kwiatkowski, Tom, et al. "Natural questions: a benchmark for question answering research." Transactions of the Association for Computational Linguistics 7 (2019): 453-466. (Year: 2019).*

Dadure, Pankaj, Partha Pakray, and Sivaji Bandyopadhyay. "BERT-Based Embedding Model for Formula Retrieval." CLEF (Working Notes). 2021. (Year: 2021).*

Kratzwald, Bernhard, Anna Eigenmann, and Stefan Feuerriegel. "Rankqa: Neural question answering with answer re-ranking." arXiv preprint arXiv:1906.03008 (2019). (Year: 2019).*

Adiwardana et al., "Towards a human-like open-domain chatbot," CoRR, Jan. 27, 2020, arxiv.org/abs/2001.09977, 38 pages.

Brown et al., "Language models are few-shot learners," CoRR, May 28, 2020, arXiv:2005.14165, 75 pages.

Hoffman et al., "Training compute-optimal large language models," CoRR, Mar. 29, 2022, arXiv:2203.15556, 36 pages.

International Search Report and Written Opinion in International Appln. No. PCT/EP2023/052286, dated Mar. 29, 2023, 16 pages.

Kudo et al., "SentencePiece: A simple and language independent subword tokenizer and detokenizer for Neural Text Processing," CoRR, Aug. 19, 2018, arXiv:1808.06226, 6 pages.

Lazaridou et al., "Internet-augmented language models through few-shot prompting for open-domain question answering," CoRR, May 23, 2022, arXiv:2203.05115v2, 20 pages.

Rae et al., "Scaling language models: Methods, analysis & insights from training gopher," CoRR, Dec. 8, 2021, arxiv.org/abs/2112.11446, 120 pages.

Raffel et al., "Exploring the limits of transfer learning with a unified text-to-text transformer," CoRR, Oct. 23, 2019, arXiv:1910.10683, 67 pages.

* cited by examiner

AUGMENTING MACHINE LEARNING LANGUAGE MODELS USING SEARCH ENGINE RESULTS

CROSS-REFERENCE TO RELATED APPLICATION

This disclosure claims priority to Greek Application No. 20220100089, entitled "Machine Learning Language Models Using Search Engine Results" and filed on Jan. 31, 2022. The disclosure of the prior application is considered part of and is incorporated by reference in the disclosure of this application.

BACKGROUND

This specification relates to processing inputs using neural networks.

Neural networks are machine learning models that employ one or more layers of nonlinear units to predict an output for a received input. Some neural networks include one or more hidden layers in addition to an output layer. The output of each hidden layer is used as input to the next layer in the network, e.g., the next hidden layer or the output layer. Each layer of the network generates an output from a received input in accordance with current values of a respective set of parameters.

SUMMARY

This specification describes a system implemented as computer programs on one or more computers in one or more locations that executes a neural network configured to process a network input representing an input text and to generate a network output representing a prediction about the input text.

To generate the network output, the system is configured to generate a search engine query for a search engine from the input text, and to obtain a set of results from the search engine in response to the query. The system can then incorporate the results of the search engine query into the network input before processing the network input using the neural network. In this way the system can, for example, perform a language processing task using the neural network, such as question answering, with substantially less computing resources than would otherwise be needed. Also, because the network output can incorporate information embedded into the search engine results, including up-to-date information that was not available during the training of the neural network, the prediction about the input text can be improved.

The subject matter described in this specification can be implemented in particular embodiments so as to realize one or more of the following advantages.

Large-scale language models implemented as neural networks can produce impressive results on a range of natural language processing tasks, including question answering. However implementations of some these models, particularly Transformer-based models, can have more than a billion parameters and can require substantial computing resources, power, and time to process a network input to generate the network output. Sometimes such models can have more than 10 billion or more than 100 billion parameters. If such models were used at scale to serve a large number of user requests, significant energy would be consumed.

An additional consideration arises when the neural network is implemented on a digital assistant device, e.g., a mobile device, implemented in a computing system that includes a back end component, in particular a data server, in communication with the digital assistant device over a data communications network such as the Internet. There is then a need to optimize the computing load between the digital assistant device and the back end component. This need can be particularly acute with a large-scale language model because of its substantial memory and computing requirements compared with those typically found on a mobile device.

The techniques described herein address these problems. In some implementations the described techniques facilitate a reduced a computational load, and improved load distribution, particularly when the large-scale language model is implemented as a neural network in a multitasking and parallel processing computer system, distributed across multiple sites and interconnected by a data communication network.

In some implementations the described techniques enable a beneficial distribution of computing load between a local, mobile computing device and a back-end server in a network. More particularly, in implementations, by conditioning the language model neural network on a plurality of conditioning inputs representing documents obtained from an Internet search based on a question, as well as on question data from the question, the use of a smaller language model neural network is enabled, which facilitates implementing the neural network on a mobile device with limited memory and computing resources.

Further, using techniques described in this specification, a system can leverage search engine results to generate a prediction about an input text using up-to-date information included in the search engine results. Some existing systems use pre-trained neural networks without access to such search engine results to generate predictions, and so the predictions can be less reliable because the neural network can only encode information that was available to the neural network during training; that is, these predictions can rely on stale information and thus be incorrect or at least out of date. Thus, using techniques described in this specification, a system can generate predictions that are more accurate and timely.

Furthermore, some existing systems must repeatedly re-train neural networks to ensure that the neural networks encode the latest information. Because the systems described in this specification can repeatedly access new search engine results, the system is not required to re-train the neural network, thus saving significant computational resources.

Using techniques described in this specification, a system can generate predictions for an input text using the information encoded in multiple different documents provided by a search engine in response to processing a search engine query. The multiple different documents can each include respective different information that is relevant to the prediction. Thus, the predictions generated by the system can be more accurate than predictions generated using a single document.

Moreover, by using multiple retrieved evidences, i.e., multiple different conditioning inputs, to generate multiple answers followed by a reranking stage that uses scores generated by the same language model neural network that generated the answers, the described system improves the quality of the generated answer without requiring a larger, harder to train neural network. That is, by augmenting the generation process as described above, the system can generate answers that exceed the quality of those generated by a larger neural network that does not access a search engine or that only generates a single answer in response to an input that include a single conditioning input. Therefore, these augmentation techniques can alleviate lower performance issues of smaller pre-trained neural networks and may be particularly suitable for deployment on devices with a constrained memory space, e.g., on mobile devices, smart speakers, or other edge devices, that prevents them efficiently storing the models with extremely large computational footprints, e.g., to an extremely large number of parameters.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
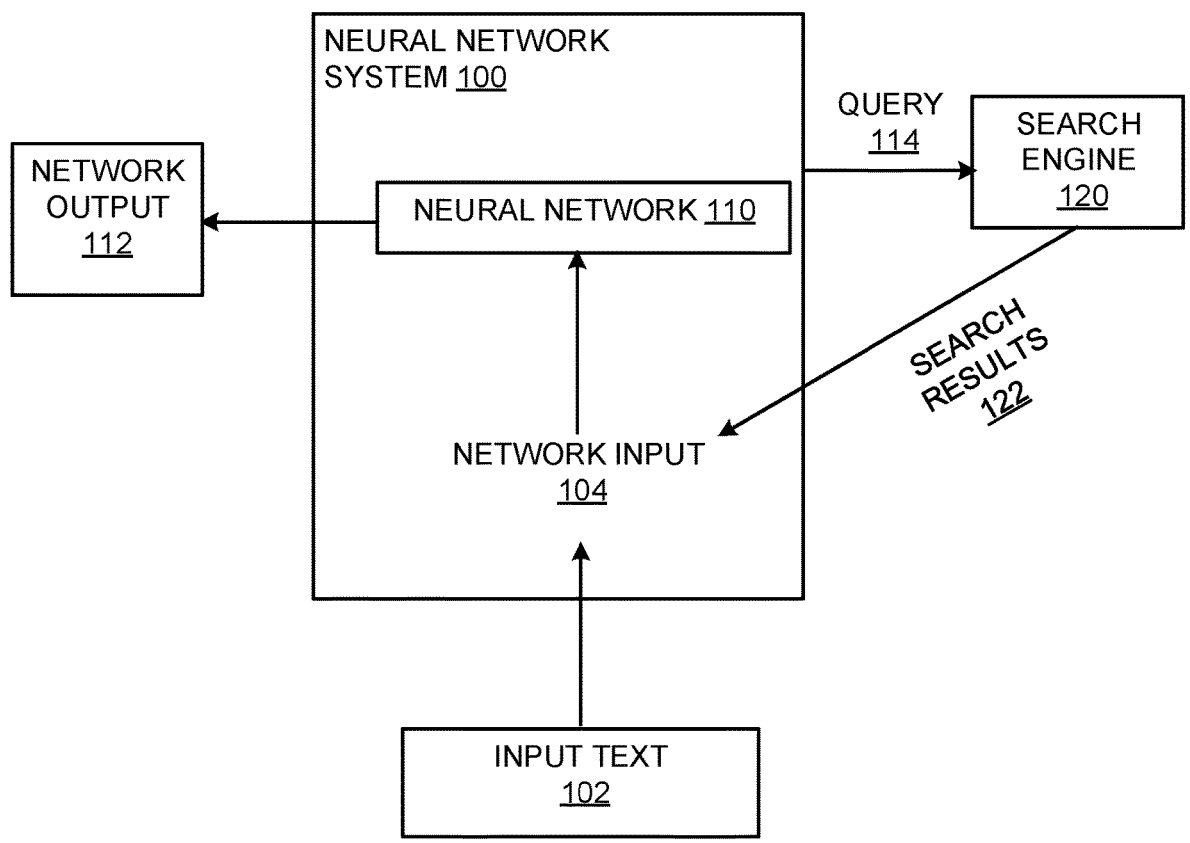
FIG. 1 is a diagram of an example neural network system.

FIG. 1 is a diagram of an example neural network system 100. The neural network system 100 is an example of a system implemented as computer programs on one or more computers in one or more locations, in which the systems, components, and techniques described below can be implemented.

The system 100 receives an input text 102 and generates a network output 112 that represents a prediction about the input text 102.

In particular, the system 100 uses a neural network 110 that is configured to process a network input 104 representing an input text 102 and to generate a network output 112 representing a prediction about the input text 102. In implementations the neural network 110 can be a pre-trained neural network.

To generate the network output 112, the system 100 is configured to generate a search engine query 114 for a search engine 120 from the input text 102, and to obtain a set of search results 122 from the search engine 120 in response to the query 114. Each search result 122 identifies a respective document.

The search engine 120 can be any appropriate search engine that is accessible by the system 100 and that searches any appropriate corpus of documents, e.g., web pages, books, or other documents. For example, the search engine 120 can be an Internet search engine that searches through and returns results 122 that reference documents available on the Internet. As another example, the search engine 120 can be a different search engine that searches a private corpus of documents, e.g., documents available on an internal network or stored in a collection of one or more databases.

The system 100 can then incorporate the results 122 of the search engine query 114 into the network input 104 before processing the network input 102 using the neural network 110. Thus, the network output 112 can incorporate information embedded into the search engine results 122, including up-to-date information that was not available during the training of the neural network 110, thus improving the prediction about the input text 102.

The neural network 110 can have any appropriate neural network architecture that allows the model to map an input sequence of text tokens from a vocabulary to an output sequence of text tokens from the vocabulary.

For example, the neural network 110 can have an encoder-decoder Transformer-based architecture.

As another example, the neural network 110 can have a decoder-only Transformer-based architecture, where the input sequence is provided as a "prompt" to the neural network 110.

In general a Transformer-based architecture can be one which is characterized by having a succession of self-attention neural network layers. A self-attention neural network layer has an attention layer input for each element of the input and is configured to apply an attention mechanism over the attention layer input to generate an attention layer output for each element of the input. There are many different attention mechanisms that may be used.

In particular, the neural network 110 can be an auto-regressive neural network that auto-regressively generates the output sequence of text tokens by generating each particular text token in the output sequence conditioned on a current input sequence that includes (i) the input sequence followed by (ii) any text tokens that precede the particular text token in the output sequence.

More specifically, to generate a particular text token, the neural network 110 can process the current input sequence to generate a score distribution, e.g., a probability distribution, that assigns a respective score, e.g., a respective probability, to each token in the vocabulary of text tokens. The neural network 110 can then select, as the particular text token, a text token from the vocabulary using the score distribution. For example, the neural network 110 can greedily select the highest-scoring token or can sample, e.g., using top-k sampling, nucleus sampling or another sampling technique, a token from the distribution.

As a particular example, the neural network 110 can be an auto-regressive Transformer-based neural network that includes a plurality of layers that each apply a self-attention operation. The neural network 110 can have any of a variety of Transformer-based neural network architectures. Examples of such architectures include those described in J. Hoffmann, S. Borgeaud, A. Mensch, E. Buchatskaya, T. Cai, E. Rutherford, D. d. L. Casas, L. A. Hendricks, J. Welbl, A. Clark, et al. Training compute-optimal large language models, arXiv preprint arXiv:2203.15556, 2022; J. W. Rae, S. Borgeaud, T. Cai, K. Millican, J. Hoffmann, H. F. Song, J. Aslanides, S. Henderson, R. Ring, S. Young, E. Rutherford, T. Hennigan, J. Menick, A. Cassirer, R. Powell, G. van den Driessche, L. A. Hendricks, M. Rauh, P. Huang, A. Glaese, J. Welbl, S. Dathathri, S. Huang, J. Uesato, J. Mellor, I. Higgins, A. Creswell, N. McAleese, A. Wu, E. Elsen, S. M. Jayakumar, E. Buchatskaya, D. Budden, E. Sutherland, K. Simonyan, M. Paganini, L. Sifre, L. Martens, X. L. Li, A. Kuncoro, A. Nematzadeh, E. Gribovskaya, D. Donato, A. Lazaridou, A. Mensch, J. Lespiau, M. Tsimpoukelli, N. Grigorev, D. Fritz, T. Sottiaux, M. Pajarskas, T. Pohlen, Z. Gong, D. Toyama, C. de Masson d'Autume, Y. Li, T. Terzi, V. Mikulik, I. Babuschkin, A. Clark, D. de Las Casas, A.

Guy, C. Jones, J. Bradbury, M. Johnson, B. A. Hechtman, L. Weidinger, I. Gabriel, W. S. Isaac, E. Lockhart, S. Osindero, L. Rimell, C. Dyer, O. Vinyals, K. Ayoub, J. Stanway, L. Bennett, D. Hassabis, K. Kavukcuoglu, and G. Irving. Scaling language models: Methods, analysis & insights from training gopher. CoRR, abs/2112.11446, 2021; Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv:1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell, et al. Language models are few-shot learners. arXiv preprint arXiv:2005.14165, 2020.

The tokens in the vocabulary can be any appropriate text tokens, e.g., words, word pieces, punctuation marks, characters, bytes, and so on that represent elements of text in one or more natural languages and, optionally, numbers and other text symbols that are found in a corpus of text. For example, the system 100 can tokenize a given sequence of words by applying a tokenizer, e.g., the SentencePiece tokenizer (Kudo et al., arXiv:1808.06226) or another tokenizer, to divide the sequence into tokens from the vocabulary.

Prior to using the neural network 110 to generate network outputs 112, the neural network 110 is pre-trained e.g., by the system 100 or by one or more other systems.

In particular, the system 100 or the other system(s) pre-trains the neural network 110 on a language modeling task, e.g., a task that requires predicting, given a current sequence of text tokens, the next token that follows the current sequence in the training data. Equivalently, the language modeling task can require, for each given unlabeled text sequence in a training data set, predicting a text sequence that followed the given unlabeled text sequence in a corresponding document. As a particular example, the language model neural network 110 can be pre-trained on a maximum-likelihood objective on a large dataset of text, e.g., text that is publicly available from the Internet or another text corpus.

After training, the system 100 can be configured to use the search engine results 122 and the neural network 110 to perform any appropriate machine learning task.

For example, the system 100 can be configured to perform question-answering, where the input text 102 identifies a question and the network output 112 represents an answer to the question.

For example, the question can be provided by a user of the system 100, e.g., by providing the input text 102 directly to the system or by providing audio data representing a verbalization of the input text 102 to the system 100. In these implementations, the search engine results 122 can include a set of documents that are relevant to the question; thus, the neural network 110 can leverage the search engine results to answer questions using information that was not available at the time that the neural network 110 was trained. In these implementations, the data representing the input text 102 is sometimes called "question data."

As another example, the system 100 can be configured to perform fact-checking, where the input text 102 represents a statement and the network output 112 represents a prediction about whether the statement is factually true. Similarly, in these implementations, the search engine results 122 can include a set of documents that are relevant to the statement.

In some implementations, the system 100 uses the neural network 110 to perform one of these downstream tasks, e.g., question answering, without further training the neural network 110. For example, the system 100 can use a neural network 110 that has been trained only on a language modeling task to perform the question answering task.

Although the below description refers to implementations in which the system 100 is configured to perform question-answering, it is to be understood that generally the neural network 100 can be configured to perform any appropriate task using the input text.

Once the system 100 has generated the network output 112, the system 100 can provide the network output 112 to the user.

For example, the system 100 can be implemented as part of or can be in communication with a digital assistant device, e.g., a mobile device, a smartwatch or other wearable device, or a smart speaker device, and the digital assistant device can provide the network output 112 to the user, e.g., by generating speech representing the network output 112 and playing back the speech to the user over a speaker.

As another example, the system 100 can provide the network output 112 for presentation in a user interface of a user device, e.g., the user device through which the user submitted the text input 102.

Figure 2:
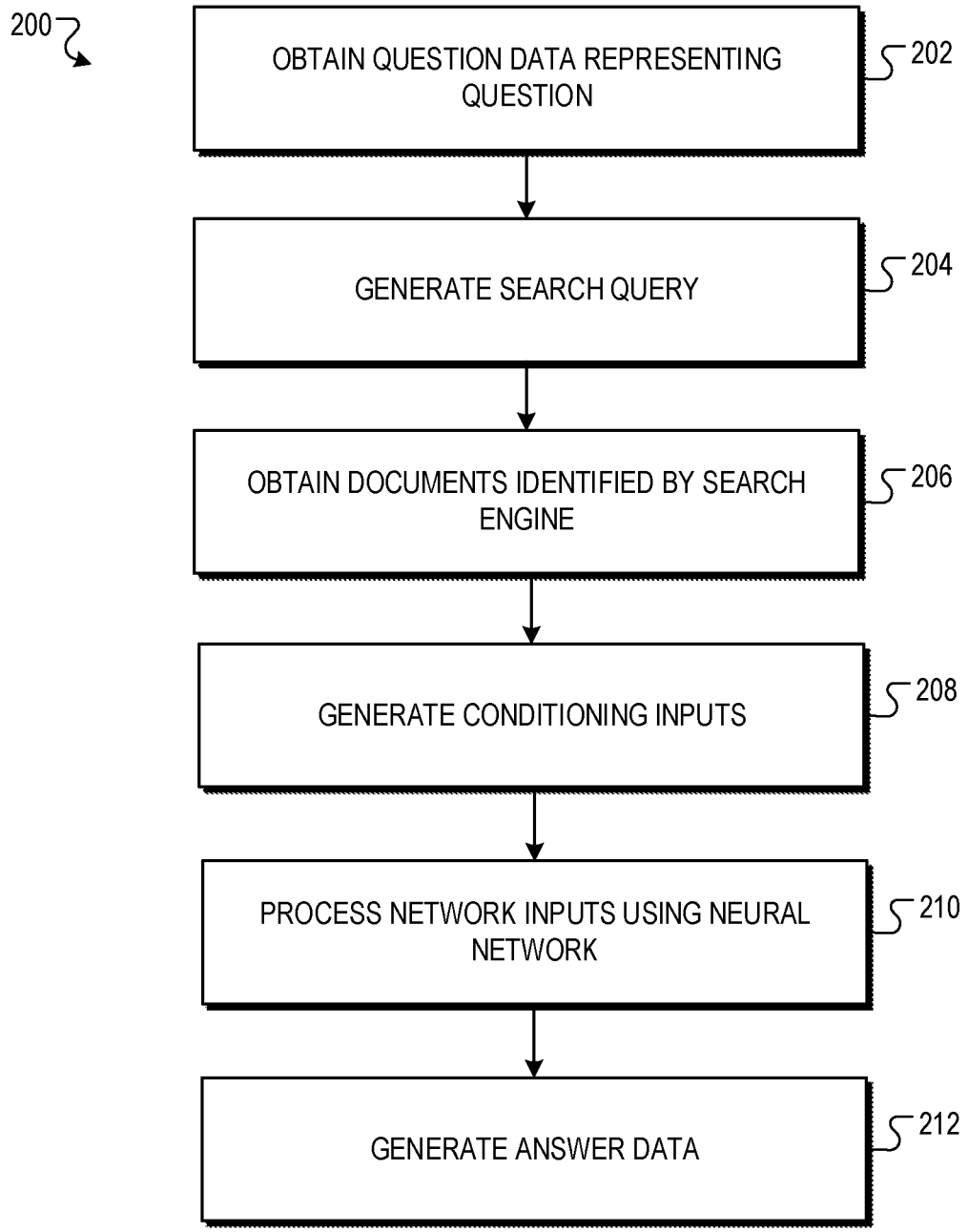
FIG. 2 is a flow diagram of an example process for generating a final answer for a received question.

FIG. 2 is a flow diagram of an example process 200 for generating a network output. For convenience, the process 200 will be described as being performed by a system of one or more computers located in one or more locations. For example, a neural network system, e.g., the neural network system 100 depicted in FIG. 1, appropriately programmed in accordance with this specification, can perform the process 200.

The system obtains question data representing a question (step 202).

The system generates, from the question data, a search engine query for a search engine (step 204).

The system can generate the search engine query from the input text, i.e., from the question data, in any appropriate way. For example, the search engine query can be (or include) the input text itself, e.g., the question that the neural network is to answer in implementations in which the neural network is configured to perform question-answering. That is, the search engine query can be equal to the input text as-is. As another example, the system can process the input text to generate updated text to act as the search engine query, e.g., by processing the input text using one or more predetermined templates. As another example, the system can process the input text using a machine learning model, e.g., by processing a sequence of tokens representing the input text using another neural network, to generate a network output representing the text of the search engine query.

The system obtains a plurality of documents identified by the search engine in response to processing the search engine query (step 206). For example, the system can receive, from the search engine, a set of search results that each identify a respective document from the corpus of documents that is searched by the search engine.

The system can submit the search engine query to the search engine and receive back a set of multiple documents D. For example, the system can submit the search engine query using an application programming interface (API) provided by the search engine. The system can be configured to obtain a predetermined number p of documents D, i.e., the p documents indexed by the search engine that were ranked the highest by the search engine in response to the submitted search engine query. In some implementations, the system receives each document in an HTML format, and processes the HTML data to extract clean text of the document.

The system generates, from the plurality of documents, a plurality of conditioning inputs each representing at least a portion of one or more of the obtained documents (step 208).

Each conditioning input represents some or all of the text of the corresponding document; e.g., the conditioning inputs can each include a respective different subsequence of the sequence of tokens representing the corresponding text. Because at least some of the documents D can be represented by sequences that are longer than the maximum sequence length that can be processed by the neural network, the system can generate multiple different conditioning inputs for a single document, where each conditioning input represents a respective different subset of the text of the document, e.g., disjoint subsets.

In some implementations, the system can generate a conditioning input from multiple different documents, e.g., by concatenating respective subsets of the text of each document.

As a particular example, for each retrieved document, the system can segment the document into fixed-size segments. Such segments are sometimes called "paragraphs," although they do not necessarily align with the original paragraphs of the document. For instance, each segment can include a predetermined number of sentences from the original document (e.g., a predetermined number of text sequences separated by periods or other designated punctuation marks). The system can then generate a respective conditioning input from each segment, e.g., by generating a sequence of tokens representing the text of the segment.

For each of a plurality of the generated conditioning inputs, the system processes a network input generated from (i) the question data and (ii) the conditioning input using a neural network to generate a network output representing a candidate answer to the question (step 210).

In some implementations, instead of generating a network input for each conditioning input, the system can determine which of the generated conditioning inputs are most relevant to the question represented by the input text, and generate a respective network input for only the most relevant conditioning inputs.

Determining relevant conditioning inputs is described below with reference to FIG. 3.

The network input for a given conditioning input can include or be generated from both the input text and the conditioning input. For example, the system can concatenate the input text and the conditioning input to generate a single sequence, e.g., with one or more delimiter tokens separating the subsequence representing the input text and the subsequence representing the conditioning input.

In some implementations, the system further uses k prompt tuples to generate the network input corresponding to each respective conditioning input, k≥1. Each prompt tuple can correspond to a respective second question that is different from the question that the neural network is to answer. Each prompt tuple can include (i) second question data representing the respective second question (e.g., a sequence of tokens representing the second question), (ii) second answer data representing an answer to the second question (e.g., a sequence of tokens representing the answer), and (iii) a second conditioning input representing a document that is relevant to the second question (e.g., a sequence of tokens representing the document). For example, the system can obtain the prompt tuples from a predetermined training data set. Including prompt tuples in the network input is sometimes called "k-shot prompting".

In some implementations, the neural network is a pre-trained neural network that has been trained on a different machine learning task than the task for which the system is using the neural network, e.g., trained on a different task than the question-answering task. Thus, in these implementations, the neural network has not been trained to generate a network output that has the appropriate format for the machine learning task for which the system is using the neural network, e.g., has not been trained to generate a network output having the required format for question-answering. Thus, the prompt tuples can be included in the network input so that the neural network has access to examples of the proper format for the output of the neural network.

For example, for each conditioning input, the system can generate a network input that includes k+1 subsequences, where k subsequences correspond to a respective second question and the $(k+1)^{th}$ subsequence corresponds to the question that the neural network is to answer. The k subsequences corresponding to the second questions can each include the corresponding second question data, second answer data, and second conditioning input, while the subsequence corresponding to the question to be answered by the neural network can include only the input text representing the question and the conditioning input (i.e., without the corresponding answer, which is to be generated by the neural network). The k subsequences corresponding to the second question can thus represent the proper format of the network output of the neural network.

As a particular example, each subsequence corresponding to a respective second question can have the following format:

[One or more "evidence" tokens]+[second conditioning input]+[one or more "question" tokens]+[second question data]+[one or more "answer" tokens]+[second answer data]

where the "evidence" tokens, "question" tokens, and "answer" tokens are any appropriate tokens that are predetermined. Then, the subsequence corresponding to the question to be answered by the neural network can have the following format:

[One or more "evidence" tokens]+[conditioning input]+[one or more "question" tokens]+[text input]+[one or more "answer" tokens]

In some implementations, the system generates multiple candidate answers for each of the network inputs. That is, the system can process each network input using the neural network a fixed number (that is greater than one) of times to generate multiple different candidate answers. Because, as described above, the system samples from probability distributions to generate each token of a given output sequence, processing the same network input multiple different times will generally result in different candidate answers being generated.

The system generates, from the network outputs representing respective candidate answers, answer data representing a final answer to the question (step 212).

In particular, for each candidate answer, the system can generate a respective likelihood value for the candidate answer representing a likelihood that the candidate answer is a correct answer to the question. The system can then select the candidate answer that has the highest corresponding likelihood value as the final answer. In other words, the system "re-ranks" the candidate answers and then selects the highest ranking candidate answer as the final answer.

Re-ranking candidate answers is described in more detail below with reference to FIG. 4.

The system can then provide the answer data as an output, e.g., by providing the answer data as speech that is played back to a user or as text to be presented in a user interface to the user.

Alternatively, after determining the final answer to the question, the system can provide the final answer to one or more external systems for storage or further processing. For example, the system can provide the final answer to a user system implemented on a device of a user for providing the final answer to the user, e.g., by displaying the final answer on a display of the device or by generating audio data representing a verbalization of the final answer and playing the audio data for the user. In some implementations, the neural network is implemented on the device of the user; in some other implementations, the neural network is implemented on a different device; e.g., the neural network can be deployed on the cloud.

Figure 3:
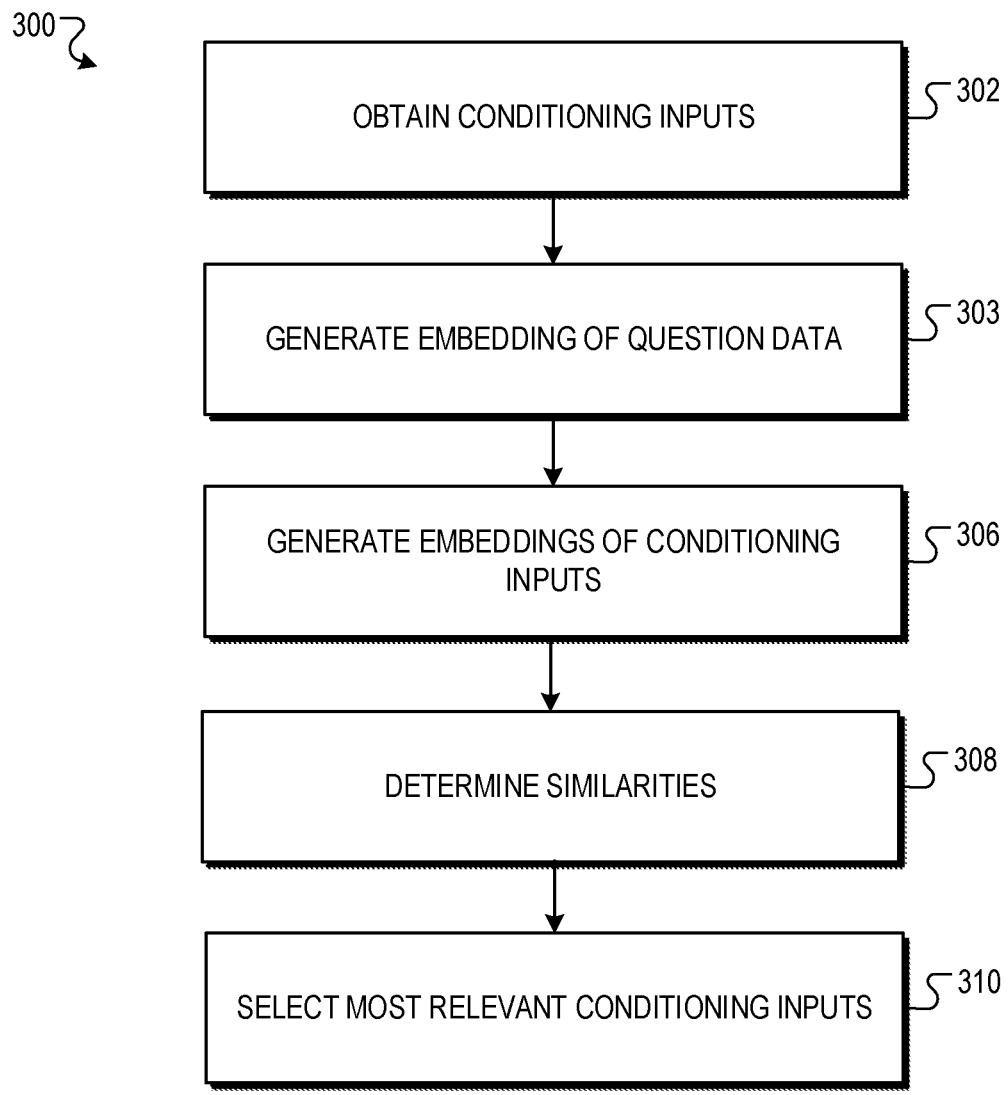
FIG. 3 is a flow diagram of an example process for determining relevant conditioning inputs.

FIG. 3 is a flow diagram of an example process 300 for determining relevant conditioning inputs. For convenience, the process 300 will be described as being performed by a system of one or more computers located in one or more locations. For example, a neural network system, e.g., the neural network system 100 depicted in FIG. 1, appropriately programmed in accordance with this specification, can perform the process 300.

The system obtains a set of candidate conditioning inputs (step 302). For example, the system can have generated each conditioning input using one or more documents identified in search results obtained from a search engine as described above.

The system generates an embedding of the question data (step 304) and a respective embedding of each conditioning input (step 306).

In this specification, an embedding is an ordered collection of numeric values that represents an input in a particular embedding space. For example, an embedding can be a vector of floating point or other numeric values that has a fixed dimensionality.

The system can generate the embedding of a sequence of text, e.g., of a conditioning input or of the question input in any appropriate way.

For example the system can generate the embedding using "term frequency-inverse document frequency" (tf-idf) embeddings, e.g., by combining the tf-idf embedding of each of the tokens in the text sequence.

As another example, the system can map each token to a word embedding, e.g., a word2vec or Glove embedding, and then combine, e.g., average or sum, the word embeddings.

As another example, the system can process a network input representing the input text using an embedding neural network, e.g., a self-attention based neural network, to generate the embedding for the input text. For example, the embedding neural network can have been trained through unsupervised learning, e.g., to minimize a BERT loss (Devlin et al. arXiv:1808.04805).

For each conditioning input, the system determines similarity between the embedding of the conditioning input and the embedding of the question data (step 308). For example, the similarity can be measured according to any appropriate similarity measure between two vectors, e.g., cosine similarity, Euclidean distance, and so on.

The system selects, as the most relevant conditioning inputs, the conditioning inputs having the highest similarities (step 310). For example, the system can select each conditioning input having at least a threshold similarity or can select a threshold number of most similar conditioning inputs.

Figure 4:
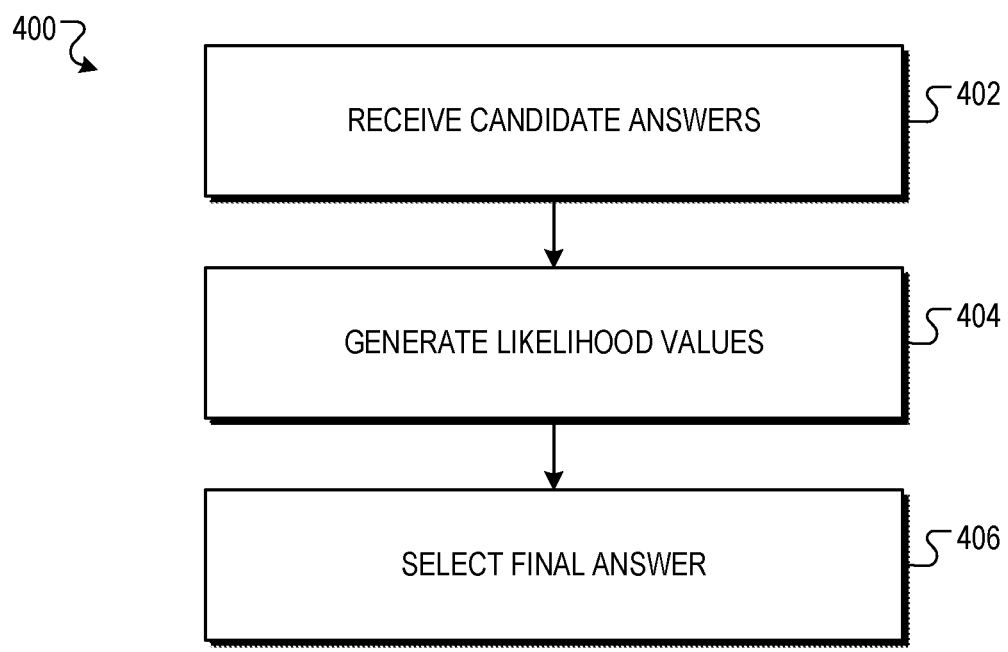
FIG. 4 is a flow diagram of an example process for re-ranking candidate answers.

FIG. 4 is a flow diagram of an example process 400 for re-ranking candidate answers. For convenience, the process 400 will be described as being performed by a system of one or more computers located in one or more locations. For example, a neural network system, e.g., the neural network system 100 depicted in FIG. 1, appropriately programmed in accordance with this specification, can perform the process 400.

The system receives a set of candidate answers (step 402).

For each candidate answer, the system generates a respective likelihood value for the candidate answer that represents the likelihood that the candidate answer is a correct answer to the question (step 404).

For example, for each candidate answer $a_i$ to the question q that was generated using one of the N conditioning inputs $p_i$ from which network inputs were generated, the system can generate a prediction of one or more of: $p(a_i|q)$ or $p(a_i, q|p_i)$ and use the prediction(s) to generate the likelihood score. As a particular example, the likelihood score can be equal to $p(a_i|q)$, to $p(a_i, q|p_i)$, or to a combination of both the probabilities using Product-of-Experts (PoE). For example PoE can compute a product or a weighted sum of the probabilities. In some implementations, PoE also considers, e.g., includes, $p(p_i|q)$ in the product or weighted sum.

For instance, the system can generate a prediction of:

$$p(a_i \mid q) = \sum_{j=1}^{N} p(p_j \mid q) \cdot p(a \mid q, p_j)$$

Instead or in addition, the system can generate a prediction of:

$$p(a_i, q \mid p_i) = \frac{p(q \mid a_i, p_i) \cdot p(a_i \mid p_i)}{p(q \mid p_i)},$$

where $p_i$ is the conditioning input that was used to generate $a_i$.

In some implementations, the system can use the similarity (or a normalized version of the similarity) computed as described above with reference to FIG. 3 as the probability $p(p_j|q)$ above. In some other implementations, the system computes this probability using the neural network as described below.

For a probability $p(x|y, z)$, the element x is sometimes called the "posterior element" and the elements y and z are sometimes called the "prior elements."

The system can use the neural network or another neural network to predict the respective probabilities, e.g., these likelihoods can be obtained from a smaller, pre-trained language model. For example, if the neural network is an autoregressive neural network, to generate a prediction for a particular probability, the system can generate a network input that includes the one or more prior elements of the particular probability, and use the trained parameter values of the neural network to determine the likelihood that the neural network would generate a network output representing the posterior element of the particular probability.

As a particular example, to generate a prediction for $p(a_i|q, p_i)$, the system can generate a network input that includes q and $p_i$ and determine the likelihood that the neural network would generate a network output identifying $a_i$. For example this likelihood may be determined from the respective probabilities of each token of $a_i$ according to the model when processing an input that includes network input that includes q and $p_i$, e.g., can be the product of the probabilities for the tokens of $a_i$.

In some such implementations, the system uses k-shot prompting to generate a network input including (i) the one or more prior elements of the particular probability and (ii) one or more prompt tuples. The system can then determine the probability that the neural network generates a network output identifying the posterior element of the particular probability by inferring the likelihood of autoregressively generating such a network output in response to processing the network input. For instance, when predicting $p(p_i|q)$, the system can use prompt tuples having form $(q',p_i')$, and determine the likelihood of generating $p_i$ given q. Similarly, when predicting $p(a_i|q,p_i)$, the system can use prompt tuples having form $(q',p_i',a_i')$ and determine the likelihood of generating $a_i$ given q and $p_i$. Similarly, when predicting $p(q|a_i, p_i)$, the system can use prompt tuples having form $(q',p_i',a_i')$ and determine the likelihood of generating q given $a_i$ and $p_i$. Similarly, when predicting $p(a_i|p_i)$, the system can use prompt tuples having form $(p_i',a_i')$ and determine the likelihood of generating $a_i$ given $p_i$. Similarly, when predicting $p(q|p_i)$, the system can use prompt tuples having form $(p_i',q)$ and determine the likelihood of generating q given $p_i$.

The system can then select the candidate answer that has the highest corresponding likelihood value as the final answer (step 406).

As previously described, in some implementations the system is implemented on a digital assistant device such as a mobile device. In such implementations the neural network can be implemented (wholly) on the mobile device. The search engine query can be processed using a back-end data server, which may be implemented using a parallel and distributed computing system. The mobile device generally has less working memory than the back-end data server, less computational capacity than the back-end data server, or both. Computational capacity can be measured in computing operations per second, e.g., FLOPS (floating point operations per second). In this way the computational load can be optimized, particularly where the neural network comprises an autoregressive, Transformer-based neural network, and where the search engine comprises an Internet search engine. This in turn can facilitate using a smaller language model, e.g., one with fewer than 10 bn parameters, e.g., 7 bn parameters, 1 bn parameters, or fewer.

Figure 5:
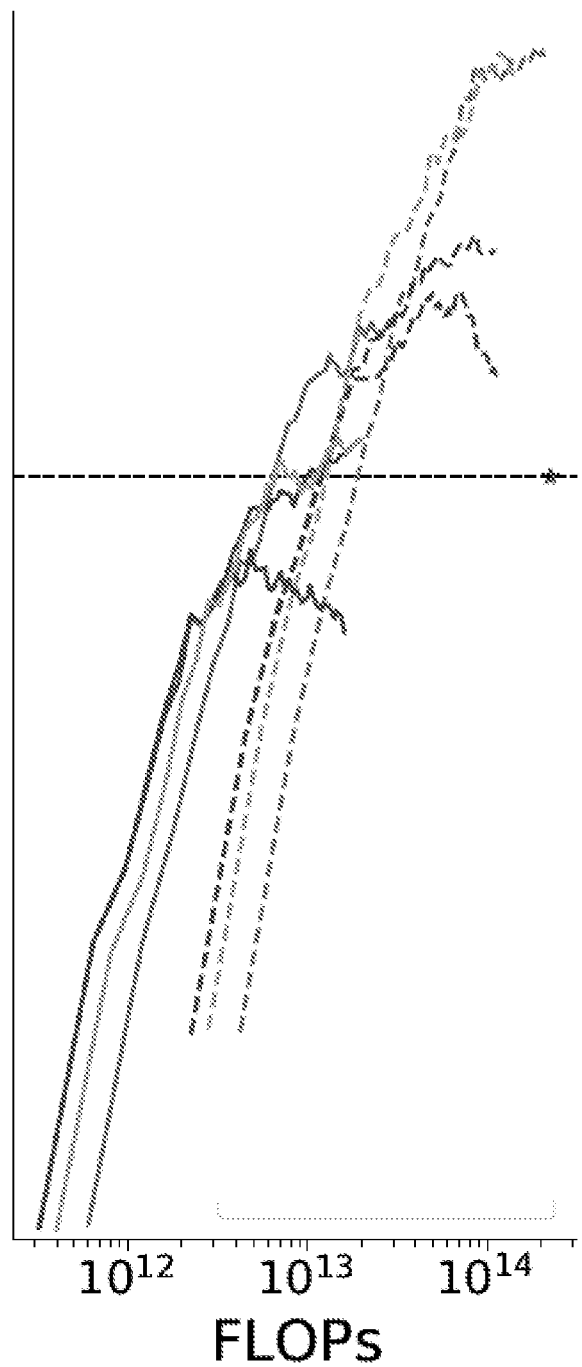
FIG. 5 illustrates performance improvements achievable by examples of the neural network system.

FIG. 5 shows exact-match question answering performance (on the y-axis) against FLOPS (on the x-axis), comparing the performance of example neural network systems of the type shown in FIG. 1 (sloping lines) with that of a pre-trained language model that does not also use a search engine (dashed horizontal line and star). The example neural network systems are either 1 bn or 7 bn parameter versions of a pre-trained Gopher language model (Rae et al. ibid), and use various different techniques for determining the likelihood that a candidate answer is a correct answer. The star illustrates the performance of a pre-trained Gopher language model with 280 bn parameters. In some cases, implementations of the described techniques are worth more than 273 bn parameters.

In some implementations the system can be used as part of a real-world control system in which the question and answer each relate to the operation of an item of machinery or tool in the real world. The method may then include obtaining a natural language question relating to the operation of the item of machinery, using a neural network system as described above to process the question to generate the final answer to the question, and then controlling the item of machinery or tool using the answer. For example the item of machinery or tool could be a robot and the question could be "What is the maximum safe load for a Model 123.45 robot?"; or the item of machinery or tool could be an oven and the question could be "At what temperature should I cook a cake?".

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   obtaining question data representing a question from a user;
   generating, from the question data, a search engine query for an Internet search engine;
   providing the search engine query to the Internet search engine;
   receiving a set of search results from the Internet search engine, wherein each search result identifies a respective document;
   identifying a plurality of documents from the respective documents identified by the search results;
   generating, from the plurality of documents, a plurality of conditioning inputs each representing at least a portion of one or more of the identified documents;
   generating, using a language model neural network that has been trained on a language modeling objective for a language modeling task with training data comprising text, a plurality of network outputs that each represents a respective candidate answer to the question by, for each of a plurality of the conditioning inputs, processing a respective network input comprising a respective input sequence of text tokens generated from (i) the question data and (ii) the conditioning input using the language model neural network to generate a network output representing a candidate answer to the question and comprising an output sequence of text tokens, wherein the language model neural network auto-regressively generates the output sequence by generating each particular text token in the output sequence conditioned on a current input sequence that includes the respective input sequence and any text tokens that precede the particular text token in the output sequence;
   generating, from the plurality of network outputs representing the respective candidate answers, answer data representing a final answer to the question; and
   providing the answer data to the user.

2. The method of claim 1, wherein generating, from the plurality of documents, the plurality of conditioning inputs comprises, for each of the plurality of documents:
   extracting, from each identified document, a text sequence; and
   determining a respective conditioning input from each of one or more subsequences of the extracted text sequence.

3. The method of claim 1, further comprising:
   for each conditioning input representing at least a portion of one or more respective documents, generating a relevance score representing a predicted relevance of at least the portion of the one or more respective documents to the question; and
   determining a ranking of the conditioning inputs according to the corresponding relevance scores,
   wherein a subset of the conditioning inputs comprises the n highest-ranked conditioning inputs in the ranking, $n \geq 1$.

4. The method of claim 3, wherein generating the relevance scores for the conditioning inputs comprises:
   generating an embedding of the question data;
   generating a respective embedding of each conditioning input; and
   for each conditioning input, determining a similarity between the embedding of the conditioning input and the embedding of the question data.

5. The method of claim 1, wherein for each network input generated from a respective conditioning input, the network input is further generated from one or more prompt tuples that each include (i) second question data representing a different second question, (ii) second answer data representing an answer to the respective second question, and (iii) a second conditioning input representing a document that is relevant to the respective second question.

6. The method of claim 5, wherein the language model neural network has been pre-trained on a language modeling task, and has not been trained on a question-answering task.

7. The method of claim 1, wherein generating, from the plurality of network outputs representing the respective candidate answers, answer data representing a final answer to the question comprises:
   generating, for each candidate answer, a respective likelihood value representing a likelihood that the candidate answer is a correct answer to the question; and
   determining the final answer to be the candidate answer corresponding to the highest likelihood value.

8. The method of claim 7, wherein for each candidate answer a' to the question q corresponding to a respective conditioning input p, generating the respective likelihood value for the candidate answer a' comprises:
   generating one or more initial likelihood values, the one or more initial likelihood values comprising one or more of:
      a first initial likelihood value representing an estimate for a probability p (a'|p, q) of the candidate answer given the conditioning input and the question,
      a second initial likelihood value representing an estimate for a probability p (a'|q) of the candidate answer given the question,
      a third initial likelihood value representing an estimate for a probability p(p|q) of the conditioning input given the question,
      a fourth initial likelihood value representing an estimate for a probability p (q|p) of the question given the conditioning input, or
      a fifth initial likelihood value representing an estimate for a probability p(q|a', p) of the question given the candidate answer and the conditioning input; and
   generating the likelihood value from the one or more initial likelihood values.

9. The method of claim 8, wherein, for at least one of the initial likelihood values representing an estimate for a probability of a respective posterior element given one or more respective prior elements, the initial likelihood value is generated using the language model neural network.

10. The method of claim 9, wherein generating a particular initial likelihood value representing an estimate for a probability of a particular posterior element given one or more particular prior elements using the language model neural network comprises:
    determining, using a set of trained parameter values of the language model neural network, a likelihood that the language model neural network would generate a second network output representing the particular posterior element in response to processing a second network input generated from the one or more particular prior elements.

11. The method of claim 10, wherein the second network input has further been generated from one or more prompt tuples having a same particular posterior element and one or more particular prior elements as the particular initial likelihood value.

12. The method of claim 1, wherein the language model neural network comprises an autoregressive, Transformer-based neural network.

13. The method of claim 1, wherein the language model neural network is implemented on a mobile device and the method further comprises:
    processing the search engine query using a back-end data server; and
    wherein the mobile device has one or both of less working memory or less computational capacity than the back-end data server.

14. One or more non-transitory computer-readable storage media storing instructions that when executed by one or more computers cause the one more computers to perform operations comprising:
    obtaining question data representing a question from a user;
    generating, from the question data, a search engine query for an Internet search engine;
    providing the search engine query to the Internet search engine;
    receiving a set of search results from the Internet search engine, wherein each search result identifies a respective document;
    identifying a plurality of documents from the respective documents identified by the search results;
    generating, from the plurality of documents, a plurality of conditioning inputs each representing at least a portion of one or more of the identified documents;
    generating, using a language model neural network that has been trained on a language modeling objective for a language modeling task with training data comprising text, a plurality of network outputs that each represents a respective candidate answer to the question by, for each of a plurality of the conditioning inputs, processing a respective network input comprising a respective input sequence of text tokens generated from (i) the question data and (ii) the conditioning input using the language model neural network to generate a network output representing a candidate answer to the question and comprising an output sequence of text tokens, wherein the language model neural network auto-regressively generates the output sequence by generating each particular text token in the output sequence conditioned on a current input sequence that includes the respective input sequence and any text tokens that precede the particular text token in the output sequence;
    generating, from the plurality of network outputs representing the respective candidate answers, answer data representing a final answer to the question; and
    providing the answer data to the user.

15. A system comprising one or more computers and one or more storage devices storing instructions that when executed by the one or more computers cause the one or more computers to perform operations comprising:
    obtaining question data representing a question from a user;
    generating, from the question data, a search engine query for an Internet search engine;
    providing the search engine query to the Internet search engine;
    receiving a set of search results from the Internet search engine, wherein each search result identifies a respective document;
    identifying a plurality of documents from the respective documents identified by the search results;
    generating, from the plurality of documents, a plurality of conditioning inputs each representing at least a portion of one or more of the identified documents;
    generating, using a language model neural network that has been trained on a language modeling objective for a language modeling task with training data comprising text, a plurality of network outputs that each represents a respective candidate answer to the question by, for each of a plurality of the conditioning inputs, processing a respective network input comprising a respective input sequence of text tokens generated from (i) the question data and (ii) the conditioning input using the language model neural network to generate a network output representing a candidate answer to the question and comprising an output sequence of text tokens, wherein the language model neural network auto-regressively generates the output sequence by generating each particular text token in the output sequence conditioned on a current input sequence that includes the respective input sequence and any text tokens that precede the particular text token in the output sequence;
    generating, from the plurality of network outputs representing the respective candidate answers, answer data representing a final answer to the question; and
    providing the answer data to the user.

16. The system of claim 15, wherein generating, from the plurality of documents, the plurality of conditioning inputs comprises, for each of the plurality of documents:
    extracting, from each identified document, a text sequence; and
    determining a respective conditioning input from each of one or more subsequences of the extracted text sequence.

17. The system of claim 15, the operations further comprising:
    for each conditioning input representing at least a portion of one or more respective documents, generating a relevance score representing a predicted relevance of at least the portion of the one or more respective documents to the question; and
    determining a ranking of the conditioning inputs according to the corresponding relevance scores,
    wherein a subset of the conditioning inputs comprises the n highest-ranked conditioning inputs in the ranking, $n \geq 1$.

18. The system of claim 17, wherein generating the relevance scores for the conditioning inputs comprises:
- generating an embedding of the question data;
- generating a respective embedding of each conditioning input; and
- for each conditioning input, determining a similarity between the embedding of the conditioning input and the embedding of the question data.

19. The system of claim 15, wherein for each network input generated from a respective conditioning input, the network input is further generated from one or more prompt tuples that each include (i) second question data representing a different second question, (ii) second answer data representing an answer to the respective second question, and (iii) a second conditioning input representing a document that is relevant to the respective second question.

20. The system of claim 19, wherein the language model neural network has been pre-trained on a language modeling task, and has not been trained on a question-answering task.

* * * * *